United States Patent
Krishnan (10) Patent No.: US 7,325,071 B2
(45) Date of Patent: Jan. 29, 2008

(54) FORWARDING TRAFFIC IN A NETWORK USING A SINGLE FORWARDING TABLE THAT INCLUDES FORWARDING INFORMATION RELATED TO A PLURALITY OF LOGICAL NETWORKS

(75) Inventor: Ram Krishnan, Santa Clara, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 926 days.

(21) Appl. No.: 10/340,113

(22) Filed: Jan. 10, 2003

(65) Prior Publication Data
US 2003/0225907 A1 Dec. 4, 2003

Related U.S. Application Data

(60) Provisional application No. 60/385,945, filed on Jun. 4, 2002.

(51) Int. Cl.
*G06F 15/173* (2006.01)
*H04L 12/28* (2006.01)
*G06F 15/16* (2006.01)
*H04L 12/56* (2006.01)

(52) U.S. Cl. .................. 709/238; 709/217; 370/395.31

(58) Field of Classification Search ................ 709/238, 709/239–250, 200–204, 217–224, 225–227; 379/272–277; 711/206, 211, 207, 216; 719/310; 370/395.31, 392, 230.1; 707/1
See application file for complete search history.

(56) References Cited

U.S. PATENT DOCUMENTS

| | | | |
|---|---|---|---|
| 5,617,421 A * | 4/1997 | Chin et al. | 370/402 |
| 5,982,775 A * | 11/1999 | Brunner et al. | 370/401 |
| 6,011,795 A * | 1/2000 | Varghese et al. | 370/392 |
| 6,119,170 A * | 9/2000 | Schoffelman et al. | 709/244 |
| 6,181,698 B1 * | 1/2001 | Hariguchi | 370/392 |
| 6,208,649 B1 | 3/2001 | Kloth | |
| 6,266,706 B1 * | 7/2001 | Brodnik et al. | 709/242 |
| 6,307,855 B1 | 10/2001 | Hariguchi | |
| 6,389,579 B1 * | 5/2002 | Phillips et al. | 716/6 |
| 6,490,259 B1 * | 12/2002 | Agrawal et al. | 370/331 |
| 6,539,369 B2 * | 3/2003 | Brown | 707/1 |
| 6,594,704 B1 * | 7/2003 | Birenback et al. | 709/238 |
| 6,611,872 B1 * | 8/2003 | McCanne | 709/238 |
| 6,665,297 B1 * | 12/2003 | Hariguchi et al. | 370/392 |
| 6,691,218 B2 * | 2/2004 | Brown | 711/216 |
| 6,697,363 B1 * | 2/2004 | Carr | 370/389 |
| 6,711,172 B1 * | 3/2004 | Li | 370/401 |
| 6,956,858 B2 * | 10/2005 | Hariguchi et al. | 370/395.31 |
| 6,980,515 B1 * | 12/2005 | Schunk et al. | 370/230.1 |
| 7,080,157 B2 * | 7/2006 | McCanne | 709/238 |
| 2002/0021697 A1 * | 2/2002 | Tsuchiya et al. | 370/392 |
| 2004/0001485 A1 * | 1/2004 | Frick et al. | 370/389 |

OTHER PUBLICATIONS

Wright, Gary R. and Stevens, Richard, TCP/IP Illustrated, vol. 2: The Implementation, Addison Wesley, 1995, pp. 559-600.

* cited by examiner

*Primary Examiner*—Haresh Patel (57) ABSTRACT

A method and system for forwarding traffic from a plurality of logical networks using a single forwarding table. Traffic is received in the form of packets with a key and a logical traffic identifier. The routing table is traversed to a forwarding table entry having a longest prefixed search value that matches the key and having a logical network identification array in which the logical traffic identifier may be represented. If the logical traffic identifier is represented in the logical network identification array, then the packet is forwarded in accordance with forwarding information associated with the forwarding table entry.

11 Claims, 11 Drawing Sheets

FORWARDING TRAFFIC IN A NETWORK USING A SINGLE FORWARDING TABLE THAT INCLUDES FORWARDING INFORMATION RELATED TO A PLURALITY OF LOGICAL NETWORKS

CROSS REFERENCE TO RELATED APPLICATION

This application is entitled to the benefit of provisional Patent Application Ser. No. 60/385,945, filed Jun. 4, 2002.

FIELD OF THE INVENTION

The present invention relates generally to data forwarding in a packet-based network, and more particularly to forwarding data through a packet-based network that includes a plurality of logical networks.

BACKGROUND OF THE INVENTION

A packet-based network includes multiple nodes that are coupled together to facilitate the forwarding of traffic from one node to some subset of the other nodes. Nodes that intelligently forward traffic between these nodes are often referred to as routers, bridges, or switches. In the case of routers, each router typically has a plurality of ports and maintains a routing table. Traffic is received on one of the ports in the form of a packet, which may be referred to in the alternative as, e.g., a segment, frame, cell, or datagram. Each packet typically includes a header, a payload, and a trailer. The header includes, e.g., a source Internet protocol (IP) address and a destination IP address. Source and destination IP addresses are typically 32 bits long and may be represented in decimal dot notation such that any one of the 4 parts of the notation have a decimal value of 0 to 255, e.g., 127.0.0.1. The payload is data that is encapsulated within the packet. The routing table is typically traversed with the goal of finding the longest prefix match between a key and a search value in the routing table. The key is typically information that is obtained from the header of the packet, such as the destination IP address. The routing table has a plurality of routing table entries, each of which have unique search values. In other words, a prefix of the key, which is a variable number of consecutive bits starting with the most significant bit, is matched to a same length prefix of a search value of a routing table entry such that the prefix is as long as possible. In the case of an exact match, the length of the prefix is the same as the length of the key. Routing information including, e.g., a port identifier, associated with the routing table entry with the longest matching prefix is used to forward the packet to the destination of the packet or an intermediate node that is (preferably) closer to the destination, sometimes referred to as a "next hop." Often, routing tables are structured using radix tree techniques.

Figure 1A:
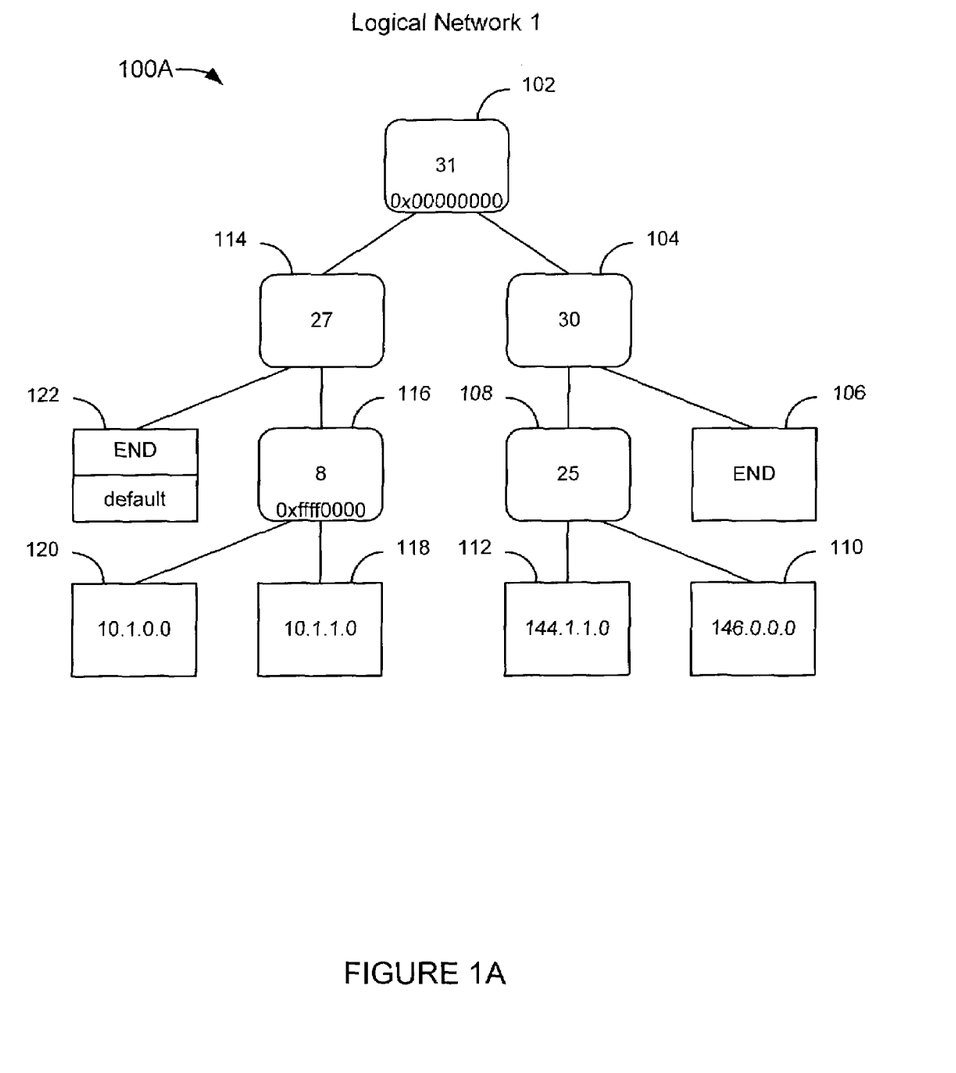
FIGS. 1A and 1B are diagrams of prior art radix tree routing tables for two exemplary logical networks.
Figure 1B:
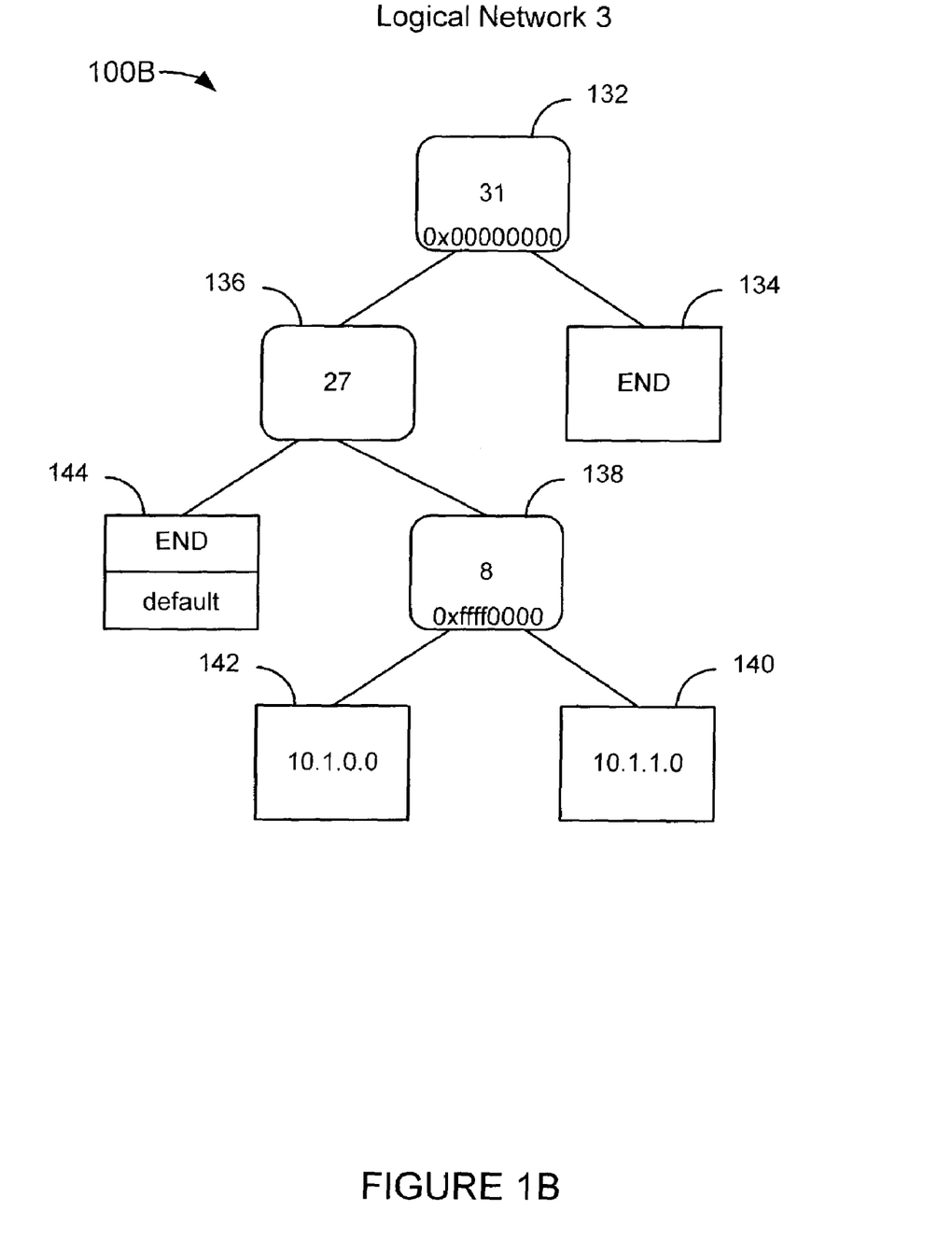

In a network that includes a plurality of logical networks, such as virtual private networks (VPNs), routing tables are typically maintained for each logical network. When routing tables are organized in radix tree structures, each logical network has a network specific radix tree. FIGS. 1A and 1B depict radix tree routing table diagrams 100A and 100B for logical networks 1 and 3, respectively. The radix tree routing table diagrams include inner nodes, e.g., inner node 102, and leaf nodes, e.g., leaf node 120. Inner node 102 is the root node and has a value of 31, which represents the most significant bit of the 32-bit key. In other words, the bit positions represented at each leaf node are numbered 31 (most significant) to 0 (least significant). Distinct routing tables are maintained for each logical network even when a first logical network, such as logical network 1, and a second logical network, such as logical network 3, are in the same physical location and their routing tables contain redundant search values, such as the value 10.1.0.0 at leaf node 120 and leaf node 142. For example, when traffic is received at a node in the form of a first packet with a logical traffic identifier that corresponds to logical network 1, the routing table that corresponds to the radix tree routing table diagram 100A is used to perform a route lookup. When traffic is received at the node in the form of a second packet with a logical traffic identifier that corresponds to logical network 3, the routing table that corresponds to radix tree routing diagram 100B is used to perform a route lookup. Moreover, when a search value must be removed from a routing table because, e.g., the search value is associated with a next hop to a node that is no longer in service, the search values must be removed from the radix tree structure that is associated with each different logical network, which consumes processing resources. Similarly, adding new nodes to the network will result in multiple redundant updates of the radix tree structures.

Accordingly there is a need for a technique for forwarding packet-based traffic that does not require distinct radix trees for each of a plurality of logical networks.

SUMMARY OF THE INVENTION

A system and method for forwarding data involves using a single forwarding table, such as a routing table, that includes forwarding information related to a plurality of logical networks to identify forwarding information for packets. A forwarding system embodying the invention is easy to configure, economical in its consumption of memory and processing resources, and can readily be used to forward data in existing networks.

In an embodiment, a system includes a forwarding table and a forwarding engine. The forwarding table includes forwarding table entries. The forwarding engine is configured to receive a packet with a key and a logical traffic identifier that corresponds to a logical network, traverse the forwarding table to a forwarding table entry in accordance with the key, verify that a logical network identification array of the forwarding table entry identifies the logical network, and forward the packet in accordance with forwarding information that is associated with the forwarding table entry.

In another embodiment, an apparatus includes an input port, a first output port, a second output port, a switching fabric, memory, and a forwarding engine. The switching fabric is for switching between the output ports. The memory is configured to store a forwarding table, including a forwarding table entry with a search value and a logical network identification array in which a first logical network and a second logical network are represented. The forwarding engine is configured to forward a first packet received on the input port through the switching fabric to the first output port in accordance with the forwarding table, a key included in the first packet, the logical network identification array, and a first logical traffic identifier included in the first packet that identifies the first logical network. The forwarding engine is further configured to forward a second packet received on the input port through the switching fabric to the second output port in accordance with the forwarding table, a key included in the second packet, the logical network identification array, and a second logical traffic identifier included in the second packet that identifies the second logical network.

In yet another embodiment, a method of forwarding data involves receiving a packet that includes an address and a logical traffic identifier that corresponds to a logical network, traversing a forwarding table in accordance with the address to a forwarding table entry that has a logical network identification array, verifying that the logical network identification array of the forwarding table entry identifies the logical network, and forwarding the packet in accordance with forwarding information associated with the logical network.

Utilizing the above-described techniques, valuable memory resources are conserved since only one forwarding table is necessary for a plurality of logical networks, eliminating redundant entries.

Exemplary figures illustrate an embodiment that is easy to configure, economical in its consumption of memory and processing resources, and can readily be used to route data in existing networks. Other aspects and advantages of the present invention will become apparent from the following detailed description, taken in conjunction with the accompanying drawings, illustrating by way of example the principles of the invention.

DETAILED DESCRIPTION OF THE INVENTION

In the following detailed description and in the several figures of the drawings, like elements may be identified with like reference numerals.

As shown in the drawings for the purposes of illustration, an embodiment is a traffic forwarding system configured for use at a network node of a packet-based network that includes a plurality of logical networks. The system of this embodiment includes a routing engine that uses a single routing table to forward traffic.

Figure 2:
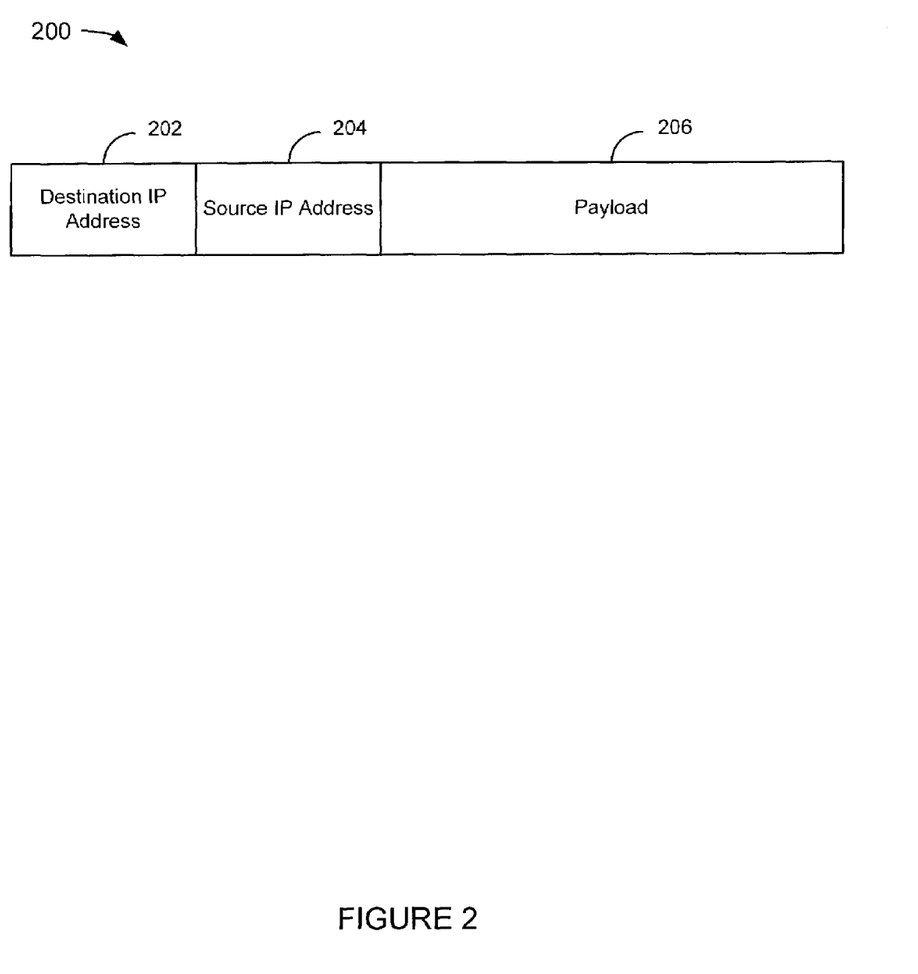
FIG. 2 is a block diagram of a packet.

FIG. 2 illustrates a packet 200 that is forwarded by the routing engine. The packet 200 is a typical Internet protocol (IP) packet. The packet 200 includes a destination IP address 202, source IP address 204, and payload 206. The destination IP address 202 and source IP address 204 are sometimes referred to as the header. The destination IP address 202 and source IP address 204 are each 4 bytes (32 bits) long.

It should be noted that the packet 200 is typically forwarded using a router, sometimes called a switch. Routers are layer 3 devices. The International Standards Organization (ISO) defines layer 3 in the Open System Interconnection (OSI) model. In alternative embodiments, the packets could be forwarded using switching, bridging, or any combination of routing, switching, and bridging. The packets described herein need not be limited to any one layer of the OSI model. Accordingly, the header could be different from that of the packet 200 illustrated in FIG. 2, a tailer could be appended to the end, etc. Also, e.g., destination addresses could be 6 bytes long, or some other length.

A field, e.g., destination IP address 202, of the packet 200 is used as a key for traversing a radix tree routing table to a longest prefix match wherein a logical traffic identifier associated with the packet 200 is represented by a radix tree routing table entry to which the key is matched. In the case of an IP address, when the longest prefix match is a not an identical match, the key is preferably matched to a network address instead.

Figure 3:
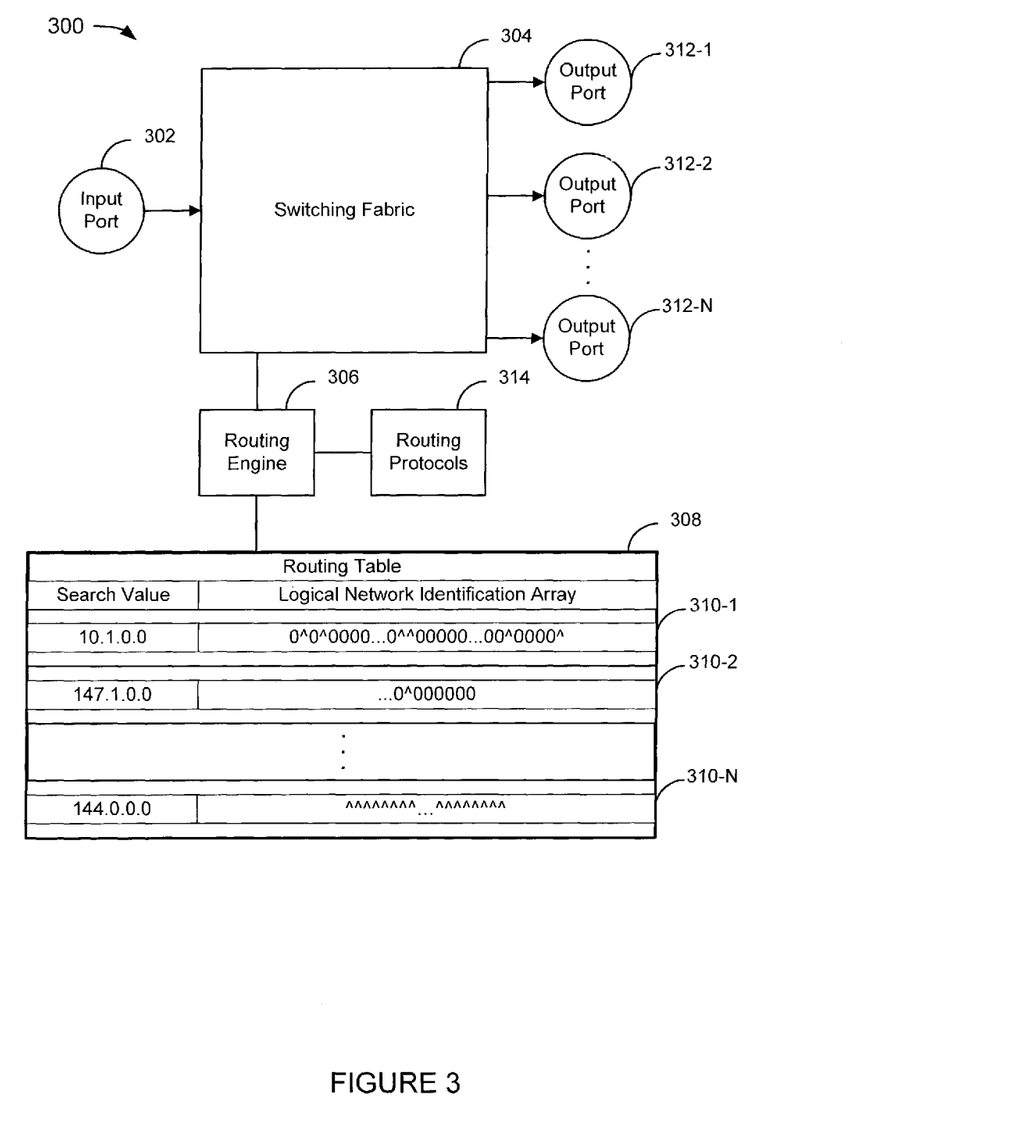
FIG. 3 is a block diagram of a traffic forwarding system in accordance with an embodiment of the invention.
Figure 4:
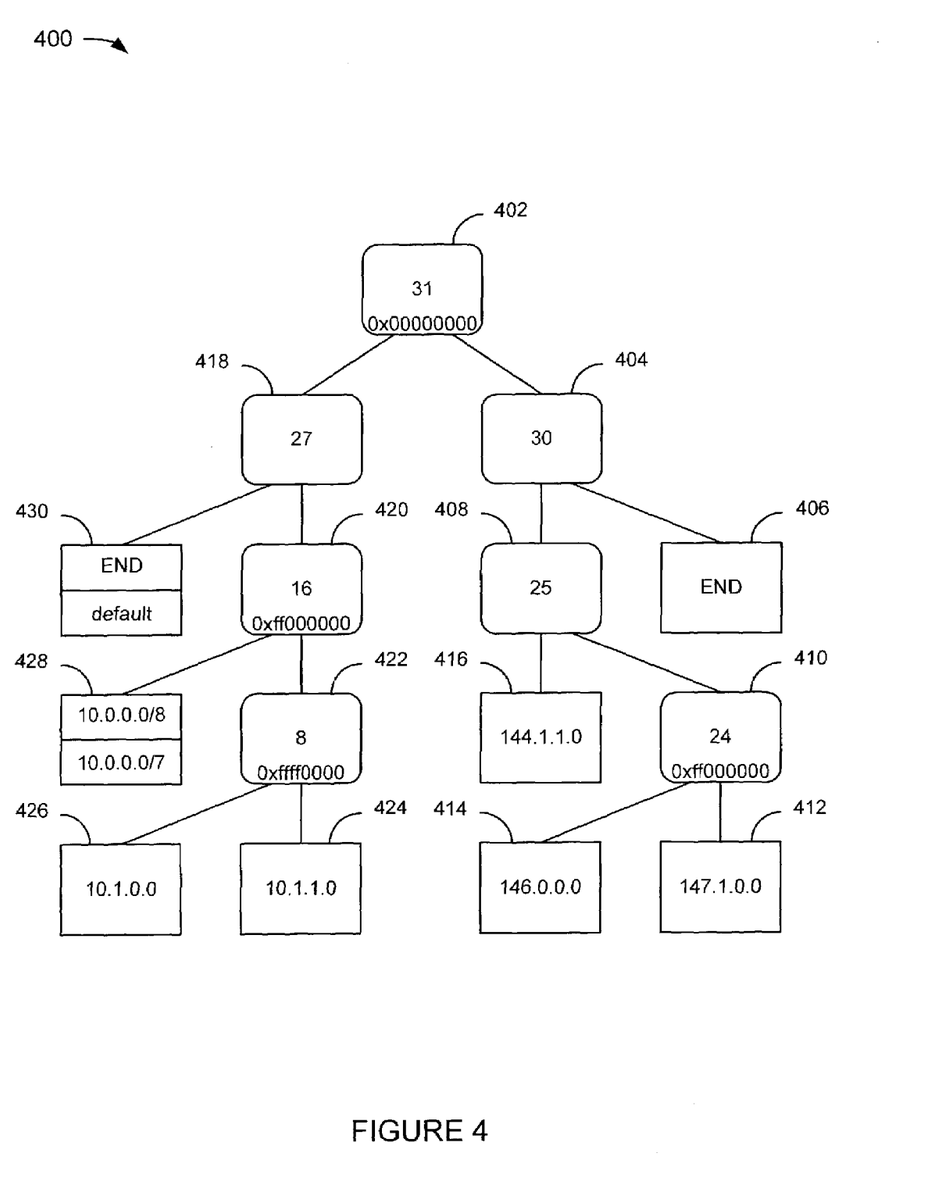
FIG. 4 is a diagram of a radix tree routing table for use in the system of FIG. 3.

FIG. 3 is a block diagram of a traffic forwarding system in accordance with an embodiment. FIG. 3 illustrates a network node 300 that includes an input port 302, a switching fabric 304, a routing engine 306, a routing table 308, output ports 312-1 to 312-N, and routing protocols 314. The switching fabric 304 is configured to switch traffic, such as the packet 200 (FIG. 2), received on the input port 302 to one or more of the output ports 312-1 to 312-N. The routing engine 306 is configured to obtain from the packet 200 a key, e.g., a destination address, and a logical traffic identifier that indicates that the packet corresponds to a logical network. That is, the logical traffic identifier identifies the logical network to which the packet belongs. The logical traffic identifier may or may not be part of the header of the packet 200. The logical traffic identifier could be a tag inserted on top of the header or an identifier in a higher or lower OSI layer packet header, e.g., a VLAN ID in tagged Ethernet frame header, or a multiprotocol label switched (MPLS) label. The logical traffic identifier may be associated with a packet based on the port, e.g., a VLAN port of entry, on which the packet is received. The routing engine 306 also preferably includes a processor for executing instructions and accessing memory. The routing table 308 is preferably configured to include a plurality of routing table entries 310-1 to 310-N. In an embodiment of the invention, the routing table entries 310-1 to 310-N correspond to leaf nodes of a radix tree routing table, an exemplary diagram of which is depicted in FIG. 4. Each routing table entry 310 is preferably associated with a search value and a logical network identification array. The logical network identification array may be implemented as a sparse array of pointers where a location in the array corresponds to a logical network. In other words, e.g., when the value at location 4 in the logical network identification array is '^', which represents a non-null pointer to next hop information, logical network 4 is represented in the logical network identification array. If, on the other hand, at location 3 the value is '0', which represents a null pointer, the logical network 3 is not represented. Next hop information preferably includes a port identifier. The port identifier identifies a port, such as output port 312-1, through which the routing engine 306 routes traffic by way of the switching fabric 304 for the associated logical network. In this way, routing information associated with each routing table entry 310 preferably includes port identifiers for each logical network that is represented in the logical network identification array. The routing table 308 and the routing protocols 314 for use by the routing engine 306 are preferably stored in memory such as random access memory (RAM). The routing protocols 314 include instructions for traversing the routing table 308 using the key, e.g., the destination address 208 of the packet 200, verifying, after traversing to a routing table entry 310, that the logical network that corresponds to the logical traffic identifier of the packet is represented at the routing table entry 310, and updating the routing table 308. The routing protocols 314 include instructions for forwarding the packet 200 in accordance with routing information in the routing table 308. It should be noted that in an alternative embodiment, the routing table 308 maintains information that is implicitly or explicitly referred to as part of the routing protocols 314 in this application.

FIG. 4 is an exemplary diagram of a radix tree routing table 400 for use in the system of FIG. 3. The root node 402 and inner nodes 404, 408, 410, 418, 420, and 422 have a number that serves as a symbolic indicator of which bit of a key is checked at that node to determine whether traversal is to the left or to the right of the root or inner node. In this example, the key is a 32-bit address, e.g., a destination IP address. Accordingly, the search values at each of the leaf nodes 406, 412, 414, 416, 424, 426, 428, and 430 are IP addresses. Traversal of the radix tree routing table 400 begins at the root node 402. The root node 402 of the radix tree routing table 400 has a value of 31, representing the first bit of the search value, where the bit locations of each search value are from 31 (most significant) to 0 (least significant). When the most significant bit of a search value is '1', such as for 146.0.0.0, which is the search value for leaf node 414, the bit is said to be "on" and the search value should fall on the right of the root node 402. (Note that the bit-by-bit representation of the search value 146.0.0.0 is: 10010010.00000000.00000000.00000000, which has a '1' in the most significant bit location.) Conversely, when the most significant bit of the key is set to '0', such as for 10.1.1.0, which is the search value for leaf node 424, the bit is said to be "off" and the search value should fall on the left of the root node 402. (Note that the bit-by-bit representation of the search value 10.1.1.0 is: 00001010.00000001.00000001.00000000.) The inner nodes 404, 408, 410, 418, 420, and 422 preferably have a value that represents the next most significant bit location after the most significant bit that distinguishes two or more search values in the radix tree routing table 400. A search value should fall to the right of an inner node when the bit is "on" and to the left when the bit is off. The radix tree routing table 400 includes two leaf nodes, leaf node 430 and leaf node 406, that are designated as ends because they have search values of all 0's (the lowest value) and all 1's (the highest value), respectively. The leftmost end, in this example leaf node 430, typically includes default routing information for the case when a key does not match any other search value by, e.g., longest prefix matching. The default may be associated with routing information to forward packets that contain no logical traffic identifier. When a key is matched to a search value, routing information that is associated with the search value is used to forward the packet associated with the key.

Some inner nodes have an associated mask. A mask identifies bits of a search field that are not relevant for the respective search. The mask consists of 32 bits (if the mask is to be applied to a 32-bit key) that correspond to the bit locations of a key. The mask typically has a series of consecutive 1's in the most significant bit locations a series of 0's in the least significant bit locations. When the key represents an address, the length of the series of consecutive 1's may be referred to as, e.g., the network address length. And the length of the series of consecutive 0's may be referred to as, e.g., the host address length. The mask is applied to the key by, e.g., ANDing the mask with the key to yield a masked key. When the key represents an address, the masked key may be referred to as, e.g., the network address. And the portion masked out may be referred to as, e.g., the host address. The mask is often represented in hexadecimal notation as, e.g., 0xff000000, where each hexadecimal (alphanumeric) character following "0x" represents 4 bits of the mask having a decimal value of 0-9 for hexadecimal 0-9 and a decimal value of 10-15 for hexadecimal a-f. Two consecutive hexadecimals have a decimal value of 0 ('00') to 255 ('ff'). When the radix tree 400 is traversed to a leaf node that does not match both the key and the logical traffic identifier of a packet, backtracking from the leaf node to the nearest higher inner node with an associated mask value occurs. The key is masked at that inner node and traversal of the radix tree routing table 400 starts to the left of the inner node, using the masked key instead of the original key.

Some leaf nodes also have an associated mask. In fact, in some cases, as represented by the upper and lower portions of leaf nodes 428 and 430, a leaf node may have two or more masks. Multiple masks are typically maintained as linked lists in radix tree routing tables. When the key and the search value at a leaf node are not an exact match, the key may be masked with the associated mask to find a longest prefix match in accordance with typical radix tree routing table traversal procedures that are well known in the art.

Figure 5A:
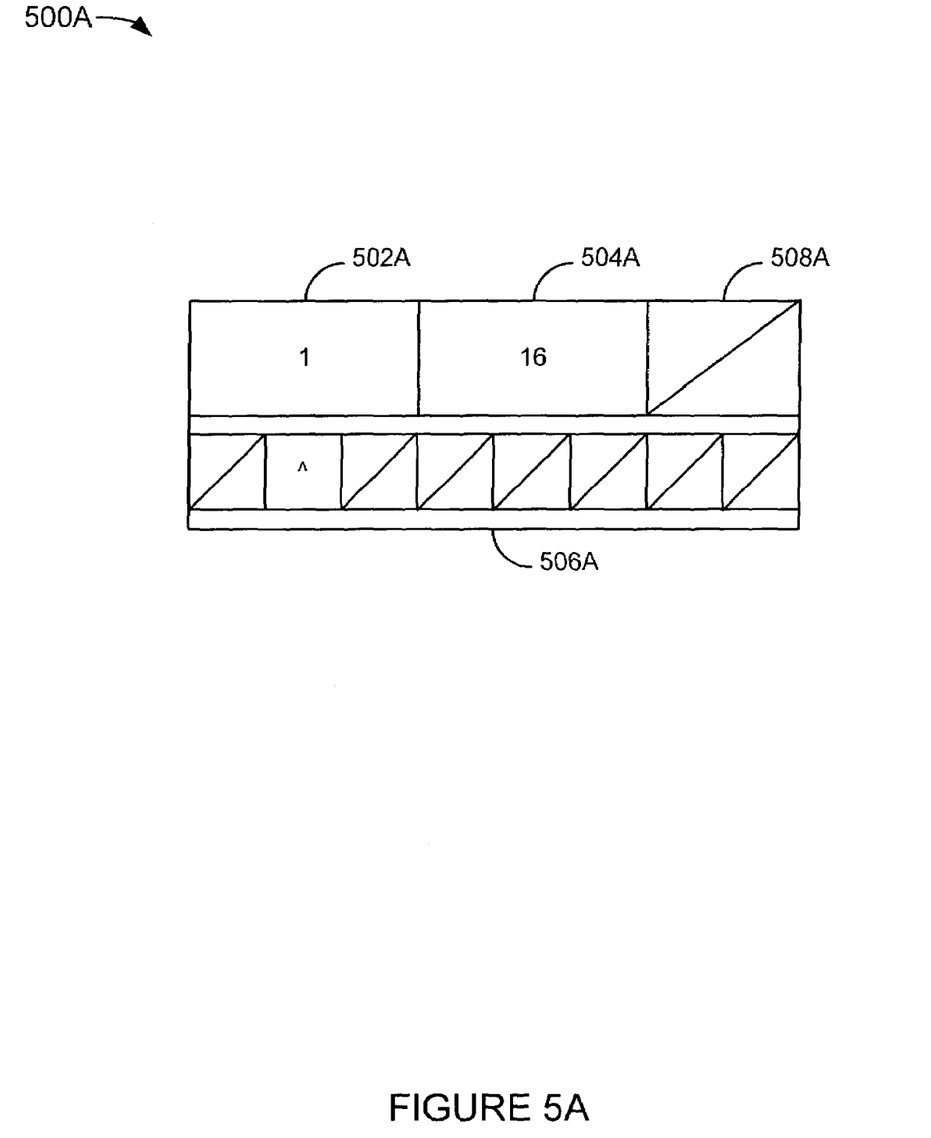
FIGS. 5A-5C are block diagrams of forwarding table entries for use in the system of FIG. 3.
Figure 5B:
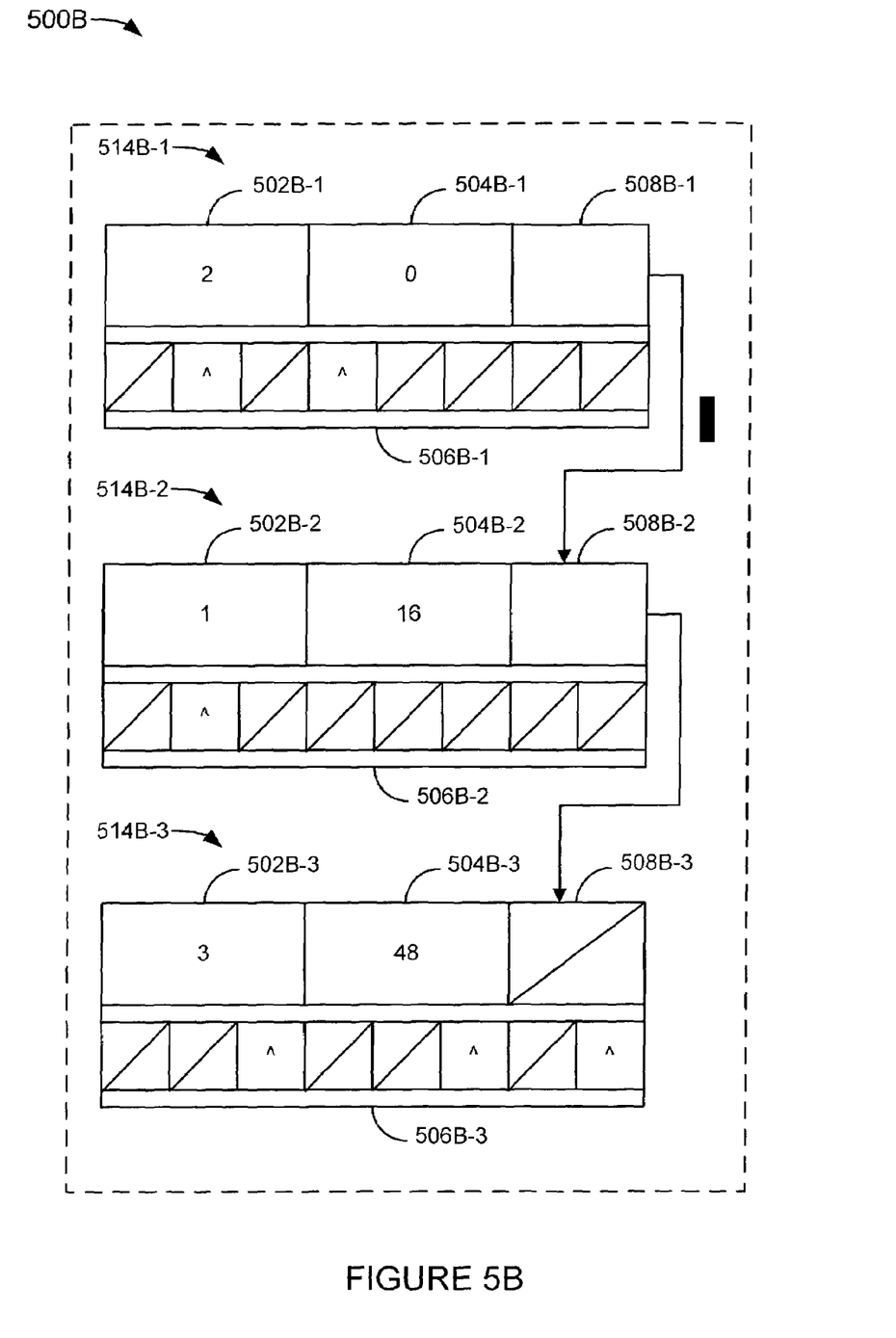

FIGS. 5A and 5B are exemplary block diagrams of forwarding table entries that could be associated with leaf nodes of radix tree 400 in an embodiment. The reference numbers of FIGS. 5A-5B comprise a first (number) portion, e.g., 504, and a second (letter) portion, e.g., A. The second portion may contain an additional designation, e.g., 504B-2 has a first portion of 504 and a second portion of B-2. Henceforth, when referring collectively to similar field types, the second portion is dropped. The forwarding table entries 500 may be associated with a search value, a mask value, or some other information that is used to traverse, e.g., a radix tree routing table.

FIG. 5A depicts a forwarding table entry 500A. FIG. 5A serves to introduce a subset of the fields associated with a forwarding table entry 500A in an embodiment of the invention. The forwarding table entry 500A includes a block reference count 502A, a segment offset 504A, a logical network identification array segment 506A, and a sparse array pointer 508A. The block reference count 502A preferably contains the number of logical networks that are identified in the logical network identification array segment 506A. In forwarding table entry 500A, there is one non-null pointer (illustrated as a '·' in FIG. 5A) in the logical network identification array segment 506A. Accordingly, the value of the block reference count 502A is one. The segment offset 504A preferably contains an offset to a logical network identification array segment 506A. The logical network identification array segment 506A is an array of pointers to next hop information. The next hop information may include, e.g., the output port number associated with a logical network, a MAC address, or other information. In a logical network identification array that includes the logical network identification array segment 506A, a logical network is represented by a non-null pointer at a position (offset by the segment offset 504A) that is associated with the logical network in the logical network identification array segment 506A. The segment offset 504A plus the position of the non-null pointer provides a numerical identifier of the logical network. When the pointer at the position (offset by the segment offset 504A) is null, the logical network is not represented in the logical network identification array segment 506A. In a preferred embodiment, the non-null pointer contains next hop information that identifies a port on which a received packet having a logical traffic identifier associated with the logical network is forwarded. The sparse array pointer 508A is a pointer to additional forwarding table entries that have a segment offset that is different from the segment offset 504A. The sparse array pointer 508A is null, which serves to represent that the logical network identification array contains only one logical network identification array segment 506A. Accordingly, since the logical network identification array segment 506A contains only one non-null pointer, only one logical network is represented in forwarding table entry 500A. That logical network is logical network 17 (the position of the pointer from left to right starting at position 0 plus the segment offset 504A).

FIG. 5B serves to illustrate forwarding table entry 500B with a logical network identification array that includes multiple logical network identification array segments 506B-1, 506B-2, and 506B-3 in a sparse manner, thereby conserving memory in accordance with an embodiment. The forwarding table entry 500B includes three forwarding table entry blocks 514B-1, 514B-2, and 514B-3. Each block has a block reference count 502B that indicates the number of non-null pointers in the respective logical network identification array segments 506B. Each block has a distinct segment offset 504B. The sparse array pointer 508B-1 of forwarding table entry block 514B-1 points to forwarding table entry block 514B-2. The sparse array pointer 508B-2 points to forwarding table entry block 514B-3. And the sparse array pointer 508B-3 is null, which indicates that forwarding table entry block 514B-3 contains the last logical network identification array segment 506B-3 in the logical network identification array associated with forwarding table entry 500B. The logical network identification array segments 506B-1, 506B-2, and 506B-3 comprise the logical network identification array associated with the forwarding table entry 500B. As discussed above with reference to FIG. 5A, the logical networks represented in a logical network identification array segment 506B may be determined by the position of non-null pointers in the logical network identification array segments 506B plus the segment offset 504B. Accordingly, the logical network identification array associated with the forwarding table entry 500B is a sparse array in which logical networks 1, 3, 17, 50, 53, and 55 are represented.

Logical networks are typically configured in advance. The representation of logical network next hop information may be added or deleted from forwarding table entries in accordance with, e.g., routing protocols. To add a logical network 18 to the logical network identification array of forwarding table entry 500B, the forwarding table is traversed to forwarding table entry 500B. It is determined that the logical network identification array segment 506B-2 of the forwarding table entry block 514B-2 includes the position in the logical network identification array that is as associated with the logical network 18. So the pointer in position 2 of the logical network identification array segment 506B-2 (since 2 plus 16, the segment offset 504B-2, is 18) is pointed to the relevant next hop information for the logical network 18. At this point, the logical network 18 is represented in the logical network identification array. The block reference count 502B-2 is incremented to 2.

To remove the representation of a logical network 53 from the logical network identification array of forwarding table entry 500B, the forwarding table is traversed to forwarding table entry 500B. It is determined that the logical network identification array segment 506B-3 of the forwarding table entry block 514B-3 includes the position in the logical network identification array that is associated with the logical network 53. So the pointer in position 5 of the logical network identification array segment 506B-3 (since 5 plus 48, the segment offset 504B-3, is 53) is set to null. At this point, the logical network 53 is no longer represented in the logical network identification array. The block reference count 502B-3 is decremented to 2.

Figure 5C:
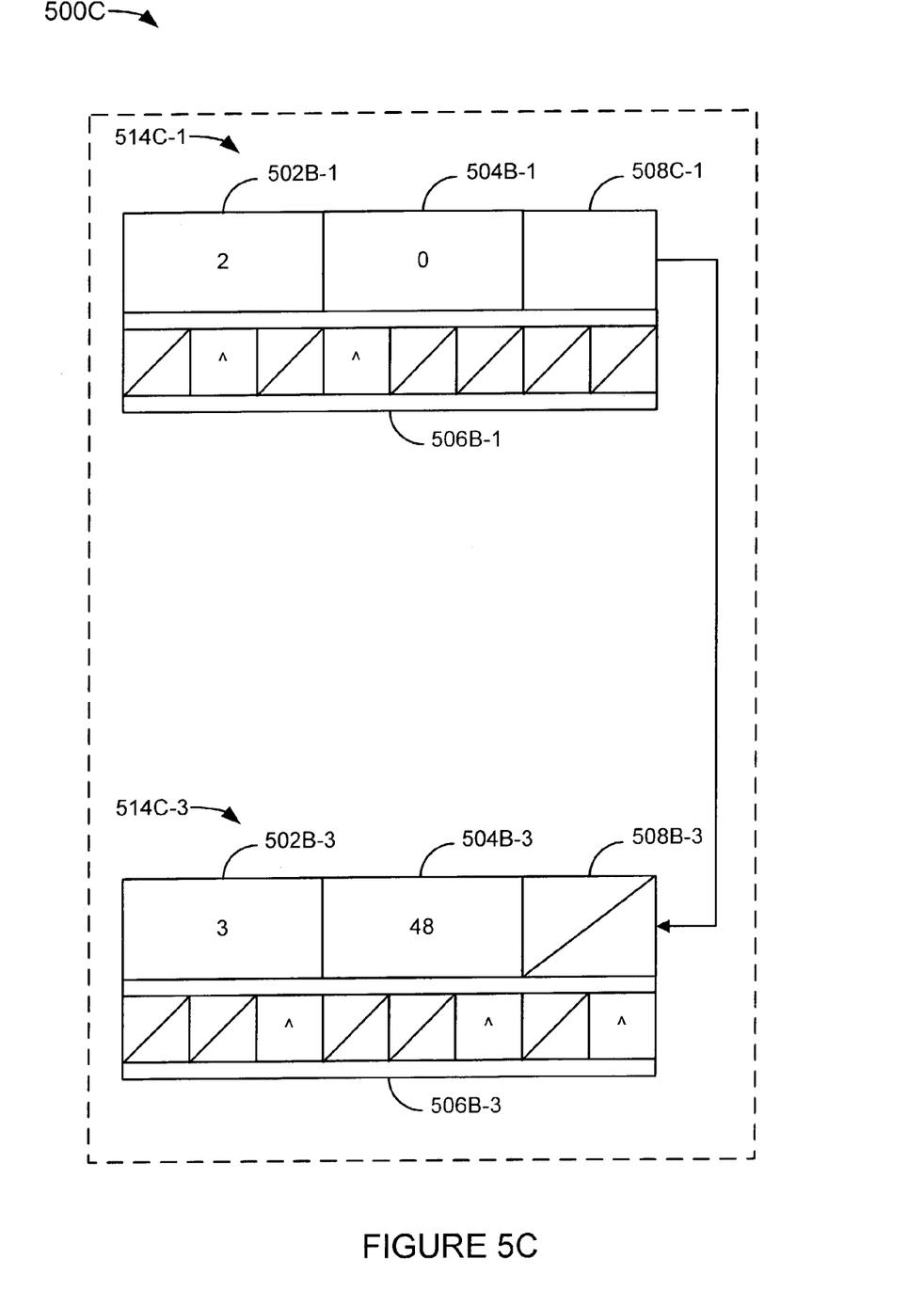

This paragraph provides an example of what happens when the last logical network in a logical network segment 506 is deleted. To delete a logical network 17 from the forwarding table entry 500B, the forwarding table is traversed to the forwarding table entry 500B. It is determined that the logical network identification array segment 506B-2 of the forwarding table entry block 514B-2 includes the position in the logical network identification array that is associated with the logical network 17. The pointer in position 1 of the logical network identification array segment 506B-2 is not null, which means logical network 17 is represented. However, since the block reference count 502B-2 is 1, there is only one non-null pointer in the logical network identification array segment 506B-2. If the pointer in position 1 is set to null, then the logical network identification array segment 506B-2 will represent no logical networks. This is not generally useful or desirable. Accordingly, the sparse array pointer 508B-1 of the preceding forwarding table entry block 514B-1 is pointed to the target of the sparse array pointer 508B-2, which is forwarding table entry block 514B-3, and forwarding table entry block 514B-2 is deleted. FIG. 5C illustrates the resulting forwarding table entry 500C. Note that if the forwarding table entry block 514B-3 were deleted instead, the sparse array pointer 508B-2 of the previous forwarding table entry block 514B-2 would be set to null. If the forwarding table entry block 514B-1 were deleted instead, the forwarding table entry block 514B-2 would become the first block. If a forwarding table entry 500B has no remaining forwarding table entry blocks 514, the forwarding table entry 500B is preferably removed from the forwarding table.

This paragraph provides an example of what happens when a new logical network identification array segment 506 must be added to represent a logical network. To add a logical network 17 to the forwarding table entry 500C, the forwarding table is traversed to the forwarding table entry 500C. It is first determined that the logical network 17 cannot be represented in any of the logical network identification array segments 506B. Then a new forwarding table entry block 514B-2 is generated with block reference count 502B-2 with a value of 1 and a segment offset 504B-2 with a value that is a multiple of the size of a logical network identification array segment 506B-2, where the offset plus a value from zero to the size of the logical network identification array segment 506B-2 identifies the logical network 17. In this case, the segment offset 504B-2 has a value of 16. The pointer at position 1 of the logical network identification array segment 506B-2 points to next hop information for the logical network 17 and the other pointers of the logical network identification array segment 506B-2 are null. The forwarding table entry block 514B-2 is inserted into the forwarding table entry 500B by pointing the sparse array pointer 508B-2 to the forwarding table entry block 514B-3 with the next highest segment offset 504B-3. The sparse array pointer 508B-1, which is in the forwarding table entry block 514B-1 with the next lowest segment offset 504B-1, points to the forwarding table entry block 514B-2. FIG. 5B represents the resulting forwarding table entry 500B. Note that if a new last forwarding table entry block were added, the sparse array pointer 508B-3 would point to the new last forwarding table entry block and the sparse array pointer of the new last forwarding table entry block would be null. Since the segment offset 504B-1 is 0, a new first forwarding table entry block would not typically be added. However, in general, the sparse array pointer of the new first forwarding table entry block points to the old first forwarding block entry. If a forwarding table does not include a forwarding table entry 500B that is desirable to represent a logical network, a forwarding table entry block similar to 500A (with an appropriate segment offset 504A, a non-null pointer in an appropriate position of the logical network identification array segment 506A, and other pointers of the logical network identification array segment 506A set to null) is preferably created.

Figure 6:
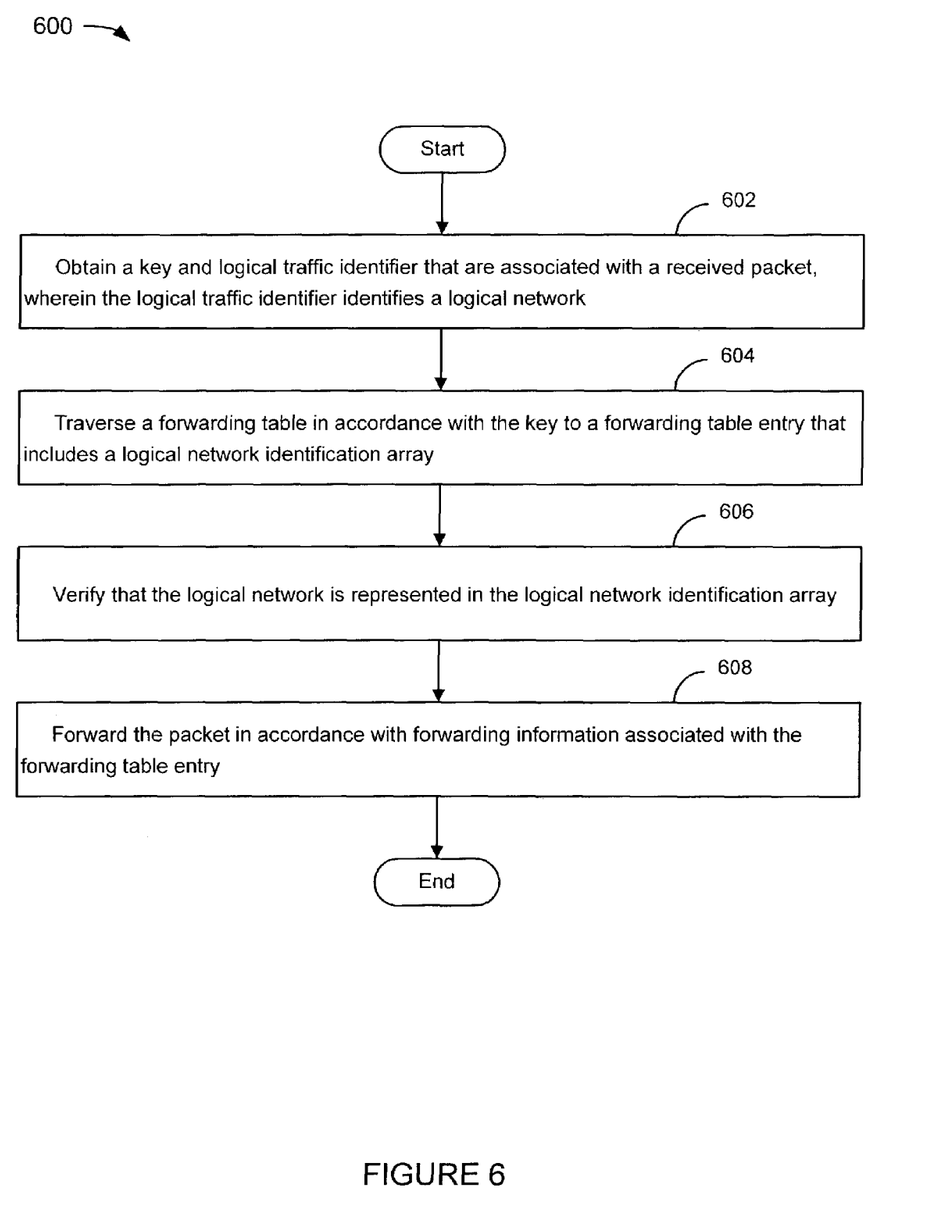
FIG. 6 is a flow chart for forwarding packets in accordance with an embodiment of the invention.

FIG. 6 is a flow chart for forwarding packets in accordance with an embodiment of the invention. The flow chart 600 starts at step 602, where a forwarding system, e.g., a switch, obtains a key and a logical traffic identifier that are associated with a received packet. The logical traffic identifier identifies a logical network. At step 604, a forwarding engine traverses a forwarding table in accordance with the key to a forwarding table entry that includes a logical network identification array. At step 606, the forwarding engine verifies that the logical network is represented in the logical network identification array. And at step 608, the forwarding engine forwards the packet in accordance with forwarding information associated with the forwarding table entry. An exemplary embodiment of this method is illustrated in FIGS. 7A and 7B.

Figure 7A:
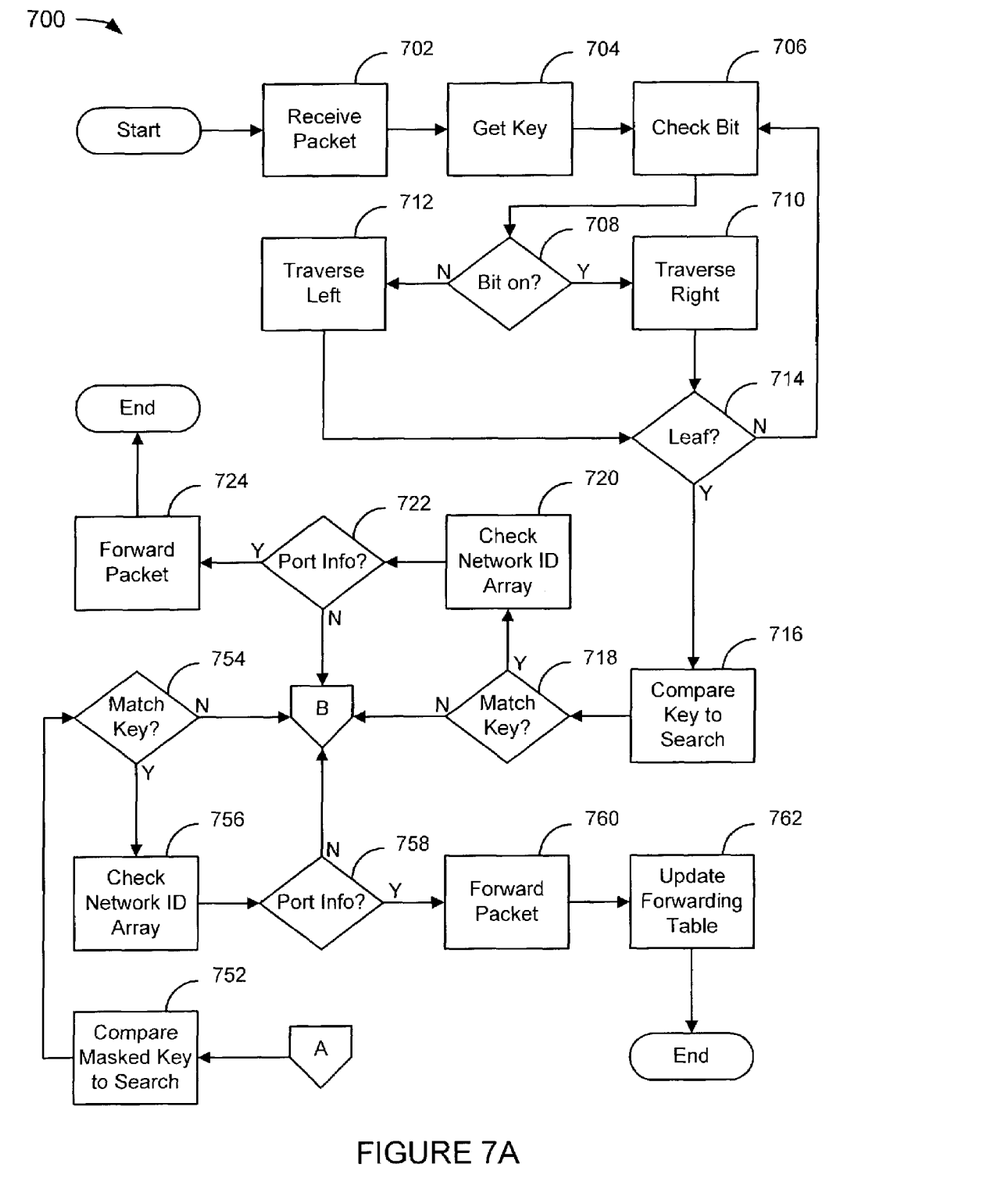
FIGS. 7A and 7B is a flow chart for traversing a radix tree routing table in accordance with an embodiment of the invention.
Figure 7B:
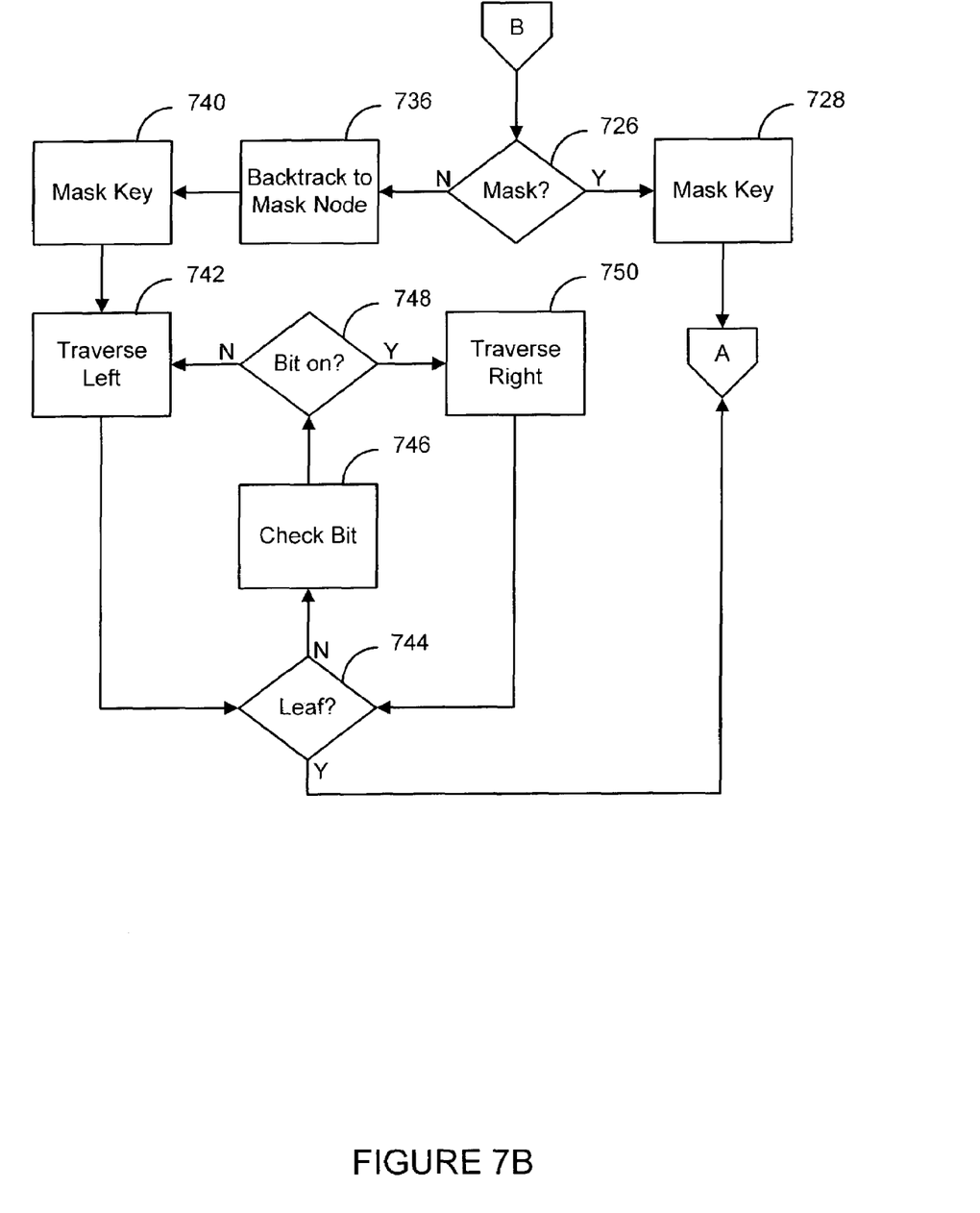

FIGS. 7A and 7B depict a flow chart for traversing a radix tree routing table in accordance with an embodiment of the invention. For the purposes of example only, the flow chart 700 is described with reference to the packet 200 of FIG. 2, the system 300 of FIG. 3, the radix tree routing table 400 of FIG. 4, where the radix tree routing table 400 is a diagram of the routing table 308, which, in this example, is implemented as a radix tree, and the routing table entries 500 of FIGS. 5A-5C. In each example, the key of the packet 200 is a destination IP address 202 and the logical network identifier of the packet 200 is a number derived from some portion of packet 200 or based upon, e.g., the input port on which the packet 200 is received. It should be noted that each step of the flow chart 700 is referred to herein as a "step." This should not be construed to mean that each step is a distinct operation. For example, steps 716 and 718 could be implemented as a single operation.

The system 300 receives the packet 200 on input node 302 at step 702. The packet 200 includes a key, e.g., a destination IP address 202, and is associated with a logical traffic identifier that corresponds to a logical network. The logical traffic identifier may be found in data associated with the packet 200, e.g., a label, determined from a port of entry for the packet 200, or established in some other way. At step 704, the routing engine 306 gets the key from the packet 200 by, e.g., parsing the header of the packet 200. At step 706, the routing engine 306 checks the most significant bit of the key at the root node 402. For the purposes of illustration, bit 31 is the most significant bit of a 32-bit address. If bit 31 is set to one, then it is "on" at step 708. The routing engine 306 traverses the tree to the right at step 710 or to the left at step 712 depending upon whether the bit in question is on or off, respectively. At step 714, the routing engine 306 determines whether the current node of the radix tree routing table 400 is a leaf node. The steps 706-714 are repeated until, in accordance with the key, the routing engine 306 traverses to a leaf node of the radix tree routing table 400. At the leaf node, the routing engine 306 compares at step 716 the key to the search value of the leaf node. The leaf node preferably has an associated routing table entry 500 that includes a logical network identification array including a logical network identification array segment 506. If the key matches the search value at step 718, then the routing engine 306 checks whether the logical network identification array represents the logical network that corresponds to the logical traffic identifier of the packet 200 at step 720. If the logical network is represented in the logical network identification array at step 722, then the routing engine 306 forwards the packet 200 at step 724 by way of the switching fabric 304 to one or more of the output ports 312 in accordance with the routing protocols 314 and next hop information, e.g., a port identifier, associated with the routing table entry 500.

If, on the other hand, at step 718 or step 722, the key or the logical traffic identifier, respectively, are not matched at the leaf node, then the routing engine 306 will instead match the key of the packet 200 to a search value having the longest matching prefix. This longest prefix match is done to find a less-specific match that can be used to forward the packet 200, since an exact match was not made. Accordingly, if the leaf node has an associated mask at step 726, the routing engine 306 masks the key at step 728. When the masked key is later compared to a search value in the routing table 308 at step 752, a match is preferably a longest prefix match. If the masked key matches the search value for the leaf node at step 754, then the logical network identification array is checked at step 756. If the logical network is represented in the logical network identification array at step 758, then the routing engine 306 forwards the packet 200 at step 760 in accordance with next hop information, e.g., a port identifier, associated with the logical network at the routing table entry 500, and updates the routing table 308 at step 762. The update at step 762 may be in accordance with a typical path-learning algorithm that waits for a response from the final destination of the packet 200 in the network, or some other update algorithm or method.

Since either, in a first case, the key of packet 200 was not matched to the search value of the first leaf node to which the routing engine 306 traversed (step 718-no), or, in a second case, though the search value matched the key, the logical network identifier of the packet 200 was not represented in the logical network identification array of the first leaf node to which routing engine 306 traversed (step 722-no), the routing engine 306 updates the routing table 308 at step 762 in accordance with the routing protocols 314. In the first case, if the update algorithm determines that an update is merited, the routing engine 306 may update the routing table 308 by adding a new leaf node. The new leaf node preferably has a search value that is the same as the key of packet 200, a logical network identification array in which the logical network identifier of packet 200 is represented, and associated next hop information that is similar to the next hop information that the routing engine 306 used to forward the packet 200 at step 760. Since at least some of the data associated with the new leaf node will typically be the same as that of the last leaf node to which the routing engine 306 traversed, the new leaf node is sometimes referred to as a clone. In the second case, the routing engine 306 preferably updates the logical network identification array of the first leaf node to which the routing engine 306 traversed such that the logical network identifier of packet 200 is represented in the logical network identification array.

With reference once again to step 726, if at step 726 the leaf node has no associated mask, then the routing engine 306 backtracks to a mask node at step 736. A mask node is an inner node, such as the inner node 422, that has an associated mask value. When the routing engine 306 backtracks to this node, it uses the associated mask to mask the key at step 740. The mask typically turns off the indicated bit at the node, so traversal of the radix tree 400 continues to the left at step 742. Steps 744 to 750 are repeated until the routing engine 306 traverses to a leaf node again.

When the routing engine 306 traverses to a leaf node again, the masked key is compared to the relevant search value at step 752. If the masked key matches the search value at step 754, then routing engine 306 checks the relevant network identification array for the logical traffic identifier of the packet 200 at step 756, and if the logical network is represented in the relevant network identification array at step 758, then the routing engine 306 forwards the packet 200 at step 760 and updates the routing table at step 762. Otherwise, if either the masked key does not match the search value 502 or the logical network is not represented in the network identification array, then the flow chart 700 restarts at step 726, as described previously.

In one embodiment, the method steps described above are embodied in a computer-readable media as computer instruction code. It shall be appreciated that not all methods steps described must be performed, nor must they be performed in the order stated.

As used herein, the terms "routing table" and "routing table entry" are defined broadly to include any type of forwarding (e.g., level 3 routing or level 2 bridging).

Although specific embodiments have been described and illustrated, the invention is not to be limited to the specific forms or arrangements of parts as described and illustrated herein. The invention is limited only by the claims.

What is claimed is:

1. An apparatus for managing forwarding of data, comprising:
   an input port;
   a first output port;
   a second output port;
   switching fabric coupled to said input port, said first output port, and said second output port;
   memory configured to store a forwarding table comprising a plurality of forwarding table entries, said forwarding table is a radix tree routing table, said plurality of forwarding table entries comprising a forwarding table entry that is associated with a key, said key comprising a destination address, said forwarding table entry comprising a sparse array pointer and a logical network identification array in which a first logical network and a second logical network are represented, said logical network identification array comprising an array of pointers pointing to respective forwarding information, said first and second logical networks corresponding to first and second array positions in said logical network identification array, said first and second array positions of said array of pointers plus a segment offset of said forwarding table entry uniquely identifying said first and second logical networks among a plurality of logical networks, pointers at said first and second array positions pointing to forwarding information associated with said first and second logical networks; and
   a forwarding engine configured to route a first packet received on said input port through said switching fabric to said first output port utilizing said forwarding table, said key, a first pointer stored at said first array position in said logical network identification array to point to first forwarding information comprising a first port identifier, and a first logical traffic identifier corresponding to said first logical network, said first logical traffic identifier to identify said first logical network, said first packet comprising said key and said first logical traffic identifier, and to route a second packet received on said input port through said switching fabric to said second output port utilizing said forwarding table, said key, a second pointer stored at said second array position in said logical network identification array to point to second forwarding information comprising a second port identifier, and a second logical traffic identifier corresponding to said second logical network, said second logical traffic identifier to identify said second logical network, said second packet comprising said key and said second logical traffic identifier.

2. A forwarding system for forwarding data, comprising:
   a forwarding table comprising a plurality of forwarding table entries, said forwarding table is a radix tree routing table, a forwarding table entry of said plurality of forwarding table entries comprising a logical network identification array and a sparse array pointer, said logical network identification array comprising an array of pointers pointing to respective forwarding information; and
   a forwarding engine coupled to a memory device, said forwarding engine configured for:
   obtaining a key and a logical traffic identifier of a packet received over a network, said key comprising a destination address, said logical traffic identifier to identify a logical network, said logical network corresponding to an array position in said logical network identification array, said array position of said array of pointers plus a segment offset of said forwarding table entry uniquely identifying said logical network among a plurality of logical networks a pointer at said array position pointing to said forwarding information associated with said logical network;
   traversing said forwarding table to said forwarding table entry in accordance with said key;
   verifying whether said logical network is represented in said logical network identification array of said forwarding table entry by determining that said pointer to said forwarding information is stored at said array position corresponding to said logical network in said logical network identification array, said forwarding information comprising a port identifier; and
   forwarding said packet to the destination address over said logical network in accordance with said forwarding information.

3. The system of claim 2, wherein, when said key corresponds to said forwarding table entry such that a longest prefix match matches said key to a prefix that is different than said key, said forwarding engine further configured for adding to said forwarding table a new forwarding table entry with a logical network identification array in which said logical network is represented, where said key corresponds to said new forwarding table entry for a subsequent longest prefix match.

4. A method for forwarding data, comprising:
   obtaining a key and logical traffic identifier of a packet received over a network, said key comprising a destination address, said logical traffic identifier identifies a logical network;
   traversing a forwarding table to a forwarding table entry using said key, said forwarding table is a radix tree routing table, said forwarding table entry comprising a logical network identification array and a sparse array pointer, said logical network identification array comprising an array of pointers to point to respective next hop information, said logical network corresponding to an array position in said logical network identification array, said array position of said array of pointers plus a segment offset of said forwarding table entry uniquely identifying said logical network among a plurality of logical networks, and a pointer at said array position pointing to next hop information associated with said logical network;

verifying whether said logical network is represented in said logical network identification array of said forwarding table entry by determining that said pointer to said next hop information is stored at said array position corresponding to said logical network in said logical network identification array, said next hop information comprising a port identifier; and forwarding said packet to the destination address over said logical network in accordance with said next hop information associated with said forwarding table entry in response to a determination that said logical network is represented in said logical network identification array.

5. The method of claim 4, wherein, when said key corresponds to said forwarding table entry such that a longest prefix match matches said key to a prefix that is different than said key, said verifying further comprises adding to said forwarding table a new forwarding table entry with a logical network identification array in which said logical network is represented, where said key corresponds to said new forwarding table entry for a subsequent longest prefix match.

6. The method of claim 4, further comprising:

first traversing said forwarding table to a first forwarding table entry having a first logical network identification array;

first verifying that said logical network is unrepresented in said first logical network identification array; and updating said forwarding table.

7. The method of claim 6, wherein said updating comprises adding a new forwarding table entry such that upon receiving a subsequent packet including said key and said logical traffic identifier, a subsequent traversing is to said new forwarding table entry.

8. The method of claim 6, wherein said updating comprises modifying said first logical network identification array such that said logical network is represented in said first logical network identification array.

9. The method of claim 6, further comprising:

passing through an inner node of said forwarding table that has an associated mask value along a first path from said node;

backtracking to said inner node;

masking said key with said associated mask value; and continuing along a second path from said inner node.

10. A computer-readable memory device encoded with instructions which, when executed by a processor, cause a routing engine to implement all the steps of the method of claim 4, the memory device having a data structure to store the array of pointers.

11. The device of claim 10, wherein said forwarding table entry comprises a block reference count to indicate a number of non-null pointers which point to next hop information.

* * * * *